(12) United States Patent
Nishikata et al.

(10) Patent No.: US 7,474,023 B2
(45) Date of Patent: Jan. 6, 2009

(54) DISC DRIVING UNIT AND DISC EQUIPMENT USING THE SAME

(75) Inventors: Toshiyuki Nishikata, Tottori (JP); Koji Kuyama, Tottori (JP); Hiroshi Ikeno, Tottori (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 11/436,243

(22) Filed: May 18, 2006

(65) Prior Publication Data

US 2006/0271945 A1   Nov. 30, 2006

(30) Foreign Application Priority Data

May 19, 2005   (JP) .............................. 2005-146258

(51) Int. Cl.
*H02K 7/00* (2006.01)
(52) U.S. Cl. ........................ 310/67 R; 310/90
(58) Field of Classification Search ............... 310/67 R, 310/89–90; 360/98.07, 99.08
See application file for complete search history.

(56) References Cited

U.S. PATENT DOCUMENTS

| | | | |
|---|---|---|---|
| 6,084,328 A * | 7/2000 | Yamashita et al. ............ 310/90 |
| 6,242,826 B1 * | 6/2001 | Saito et al. ..................... 310/51 |
| 6,424,613 B1 * | 7/2002 | Ikuta et al. .................. 369/266 |
| 2001/0013726 A1 * | 8/2001 | Katagiri et al. ........... 310/67 R |
| 2001/0038250 A1 * | 11/2001 | Katagiri et al. ........... 310/67 R |
| 2003/0020341 A1 * | 1/2003 | Nagatsuka ................. 310/67 R |
| 2004/0135462 A1 * | 7/2004 | Masayuki .................... 310/261 |

FOREIGN PATENT DOCUMENTS

| | | |
|---|---|---|
| JP | 8-51740 A | 2/1996 |
| JP | 9-247886 A | 9/1997 |
| JP | 10-23702 A | 1/1998 |
| JP | 2003-18788 A | 1/2003 |

* cited by examiner

*Primary Examiner*—Thanh Lam
(74) *Attorney, Agent, or Firm*—RatnerPrestia

(57) ABSTRACT

The disc-driving unit is formed of a rotor having a turntable on which a disc is mounted, a stator having a bearing housing, and a drop-guard mechanism for protecting the rotor from coming out of the stator. On the turntable, a plurality of engaging sections are integrally formed, while on the bearing housing, an engaged section is integrally formed. The engaged section has a plurality of recesses each of which has an opening width wide enough for passing through each of the engaging sections and a plurality of guides for helically guiding the engaging sections into the recesses. A helical engagement of the engaging sections and the engaged section completes the drop-guard mechanism.

4 Claims, 10 Drawing Sheets

DISC DRIVING UNIT AND DISC EQUIPMENT USING THE SAME

FIELD OF THE INVENTION

The present invention mainly relates to a disc-driving unit for rotationally driving optical discs, such as CDs (compact discs) and DVDs (digital versatile disc), and disc equipment using the unit; specifically, relates to a drop-guard mechanism that protects a rotor of the motor from coming out of the disc-driving unit.

BACKGROUND ART

FIGS. 14, 15, and 16 are section views illustrating different types of conventional disc-rotating motors. In a growing demand for reducing the thickness and size of a disc-driving unit, manufacturers conventionally have employed the structures shown in FIGS. 14 through 16 for a drop-guard mechanism that protects a rotor from coming out of the motor of a disc-driving unit.

As shown in FIG. 14, a conventional disc-rotating motor has rotor 101 and stator 102. Rotor 101 has shaft 121, and has downwardly protruded engaging member 104 under turntable 103. On the other hand, stator 102 has bearing housing 105 for holding bearing 122 that supports shaft 121. Bearing housing 105 contains engaged member 106. An axial engagement between engaging member 104 and engaged member 106 prevents rotor 101 from coming out of stator 102. The axial direction mentioned above is the direction along shaft 121.

Here will be described how engaging member 104 engages with engaged member 106 in the aforementioned structure.

Inserting shaft 121 of rotor 101 in bearing 122 of stator 102 allows engaging member 104 of rotor 101 to make a contact with engaged member 106 of bearing housing 105, thereby urging engaging member 104 in a radial direction. With the application of force, engaging member 104 has an elastic deformation and reaches under engaged member 106. Even if rotor 101 undergoes an upwardly applied force with respect to shaft 121, engagement between engaging member 104 and engaged member 106 can protect rotor 101 from coming out of stator 102.

The engaging method as described above has been introduced in some suggestions. In a suggestion, a resin-made or a metal-made drop-guard member, which is integrally disposed on a turntable, engages with a bearing housing. In another suggestion, elastic metal disc is fixed on a synthetic resin-made turntable. An arm-like engaging latch is integrally formed with the metal disc so as to engage with a bearing housing. Such structures are disclosed, for example, in Japanese Patent Unexamined Publication No. H09-247886 and in Japanese Patent Unexamined Publication No. H10-23702.

Another conventional disc-rotating motor shown in FIG. 15 is formed of rotor 107 and stator 108. Drop-guard member 110 with a helical groove is attached to turntable 109 of rotor 107. Drop-guard member 110 is made of a material different from that of turntable 109. A helical groove as a counterpart to be engaged with the groove of drop-guard member 110 is formed on holder 112 disposed on stator core 111 of stator 108, or on bearing housing 113 of stator 108.

When shaft 123 of rotor 107 is inserted in bearing 124 of stator 108, tightly fitting the helical groove of drop-guard member 110 with the counterpart helical groove of holder 112 or of bearing housing 113, while rotating rotor 107, completes the assembly of the motor. The structure above protects rotor 107 from coming out of stator 108. For example, Japanese Patent Unexamined Publication No. H08-51740 introduces the aforementioned structure.

FIG. 16 shows a still another conventional structure of a disc-rotating motor, which is formed of rotor 114 and stator 115. Drop-guard washer 116 is fixed at shaft 117 of rotor 114. That is, shaft 117 and drop-guard washer 116 are integrally disposed on rotor 114. If rotor 114 undergoes an upwardly applied force with respect to shaft 117, washer 116 hits against bearing 118 of stator 114, thereby protecting rotor 114 from coming out of stator 115.

Modifications may be made in the structure above such as, forming the washer into a specific shape with elasticity so that the rotor can be removed from the stator as necessary. For example, such a washer is disclosed in Japanese Patent Unexamined Publication No. 2003-18788.

In recent years, a disc-rotating motor for a disc-driving unit has to meet a wide range of demands-not only reduction in size and thickness, but also longer life (as long as several thousands hours) and higher reliability against exchanging discs as many as several tens of thousands times.

Besides, in terms of environmental protection, an effective use of resources and an environment-friendly disposal method have become an important issue. It is therefore preferable that the motor should be easily repaired, recyclable, disassembled, and classified for recycling or disposal.

In the drop-guard mechanism shown in FIG. 14, however, engaging member 104 and engaged member 106 are required to have a shape that can be elastically changed, or to be made of a material that permits an elastic change. Such a deformable design does not seem to be appropriate from the point of giving a disc-rotating motor greater durability against exchanging discs several tens of thousands times.

As described earlier, rotor 101 cannot be removed from stator 102. If possible, due to an excessive elastic deformation, break down or plastic deformation of engaging member 104 and engaged member 106 will the result. Furthermore, due to reduction in size and thickness of the product, the drop-guard mechanism has to be designed in a limited space, and accordingly, a high accuracy of components is required. Such structured disc-rotating motor is therefore not reusable.

In contrast, the drop-guard mechanism of FIG. 15 has an advantage that rotor 107 is easily removed from stator 108. However, the need for keeping a length in an axial direction arises from the structure in which a helical groove is formed in drop-guard member 110. The structural constraint is an obstacle to a disc-rotating motor formed into a compact and low profile body. Forming a helical groove needs a high accuracy, and therefore the member, on which a helical groove to be formed, should be a metallic member processed by cutting operations, or should be a resin-molded member. The limited material selection has less advantage in reducing production cost.

According to the drop-guard mechanism of FIG. 16, rotor 114 can be removed from stator 115. In addition, the mechanism can be easily established by only washer 116 fixed to shaft 117, whereby the production cost is kept relatively low. As shown in FIG. 16, the drop-guard mechanism is disposed under bearing 118. Keeping a length under bearing 118 is, too, an obstacle to further reduction in size and thickness of a product. Besides, the structure is not suitable for pursuing reliability in a long life of a product.

SUMMARY OF THE INVENTION

The disc-driving unit of the present invention is structured below. The rotor of the unit has a turntable for mounting a disc thereon, a rotor frame, and a shaft disposed on the rotor frame.

On the other hand, the stator of the unit has a bearing for supporting the shaft, a bearing housing for fixing the bearing, a stator core with a winding thereon, and a bracket for holding the bearing housing. In addition, the disc-driving unit of the present invention has a drop-guard mechanism that protects the rotor from coming out of the stator.

In the aforementioned drop-guard mechanism, a plurality of engaging members are integrally formed on the turntable. An engaged member is integrally formed on the bearing housing. The engaged member is formed of a plurality of recesses each of which has an opening wide enough for passing through each engaging member, and a plurality of guides for helically guiding the engaging members into the recesses. The drop-guard mechanism is structured by helical engagement of the engaging member with the engaged member.

The disc-driving unit of the present invention may be formed of the structure below. The rotor of the unit has a turntable for mounting a disc thereon, a rotor frame, and a shaft disposed on the rotor frame. On the other hand, the stator of the unit has a bearing for supporting the shaft, a bearing housing for fixing the bearing, a stator core with a winding thereon, and a bracket for holding the bearing housing. In addition, the disc-driving unit of the present invention has a drop-guard mechanism that protects the rotor from coming out of the stator.

In the drop-guard mechanism above, a plurality of engaging members are integrally formed on the turntable. The bearing housing contains an integrally formed first engaged member and a rotatably held second engaged member. Both of the first and second engaged members have a plurality of notches. Combination engagement of the engaging members and the first and second engaged members functions as the drop-guard mechanism.

As described above, the disc-driving unit of the present invention can provide the drop-guard mechanism formed by a helical engagement or a two-layered engagement. When the helical engagement is employed, a helical structure, which serves as an engaged member, is integrally formed on the bearing housing in an axial direction so as to have a helical engagement with an engaging member formed on the turntable. On the other hand, when the two-layered engagement is employed, a notch for passing an engaging member is formed in an engaged member. The engaged member is formed of two-layer structure with a fixed upper section and movable lower section. After the engaging member passes the notch, the lower engaged member is circumferentially rotated by the engaging member, thereby stopping up the notch disposed in the upper engaged member. With the structures above, the disc-driving unit of the present invention can provide a drop-guard mechanism that protects the rotor from coming out of the stator; at the same time, allowing the rotor to be easily removed from the stator as required.

The helical structure or the two-layer structure described above contributes to reduction in size and thickness of a product. Besides, the structure, in which the rotor can be removed from the stator as required, allows the motor to be easily reused or disassembled.

Besides, the structure can be formed of relatively low-cost material by press working. By virtue of the simple structure, a parts count can be reduced, and accordingly, assembling efficiency is enhanced.

Furthermore, the structure eliminates the need for using an elastically changing member, promising high rigidity, and therefore high reliability.

DETAILED DESCRIPTION OF THE INVENTION

The exemplary embodiments of the present invention are described hereinafter with reference to the accompanying drawings.

First Embodiment

Figure 1:
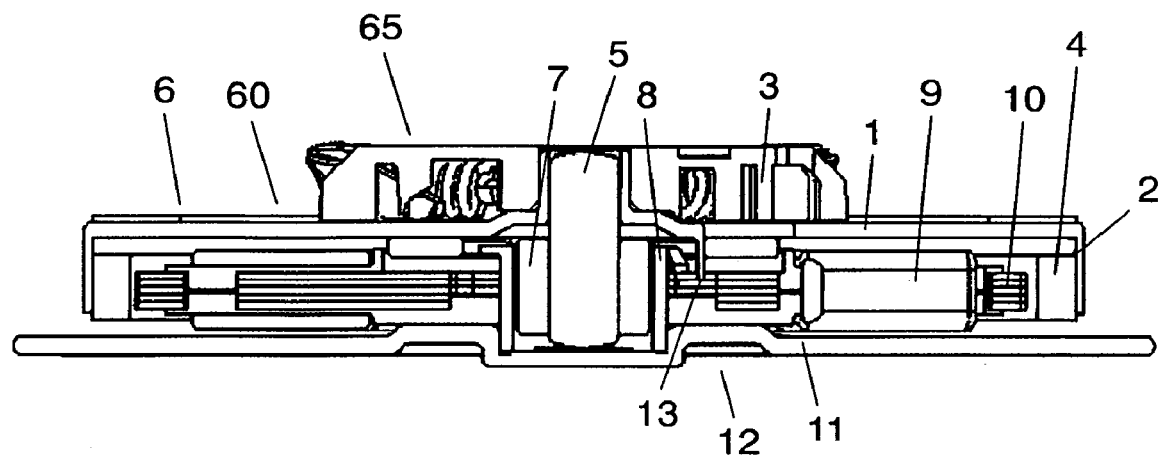
FIG. 1 is a section view illustrating the structure of a disc-rotating motor of a disc-driving unit in accordance with a first exemplary embodiment of the present invention.
Figure 2:
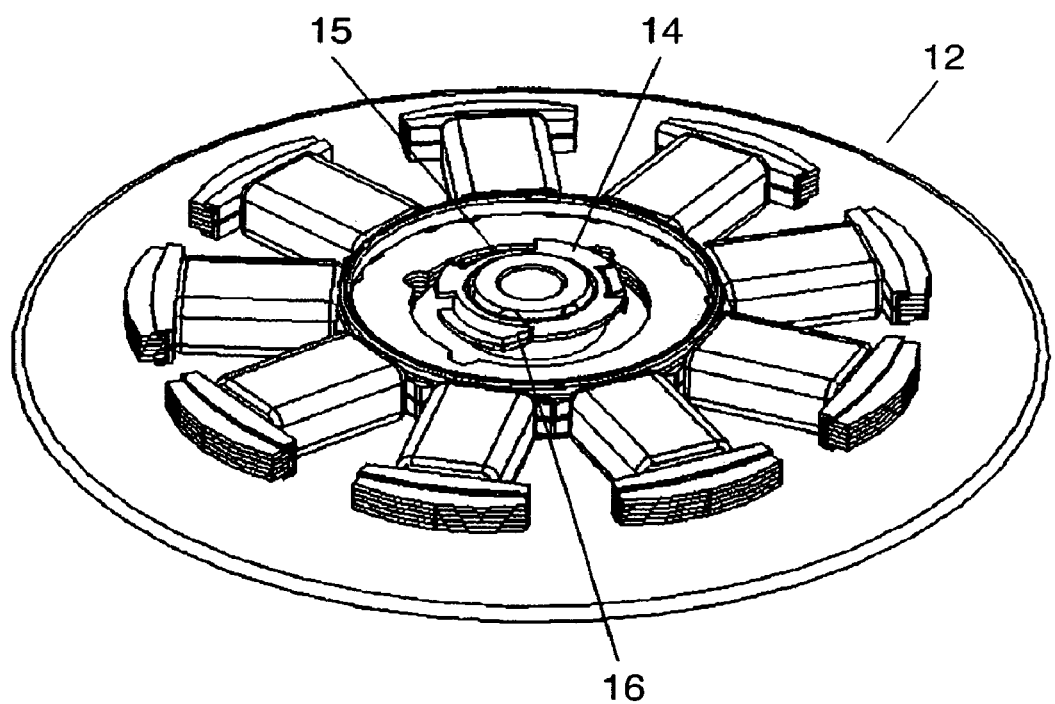
FIG. 2 is a perspective view of a stator of the motor shown in FIG. 1.
Figure 3A:
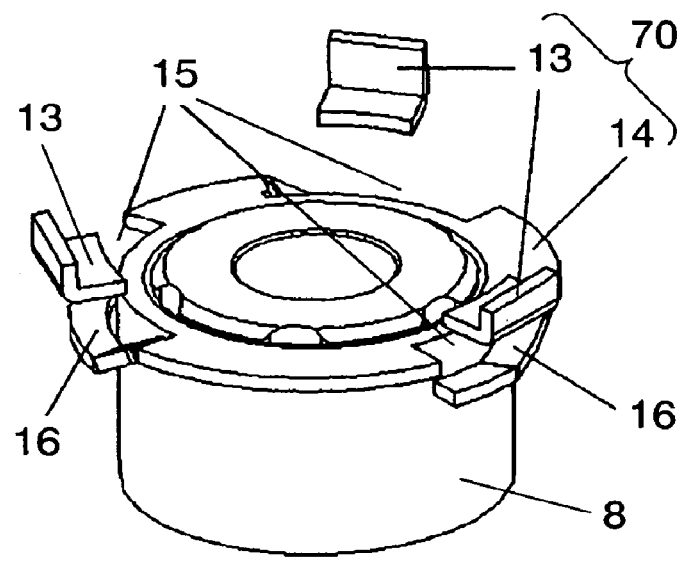
FIG. 3A is a perspective view illustrating the state before an engaging member of a turntable is engaged with an engaged member of a bearing housing in the motor shown in FIG. 1.
Figure 3B:
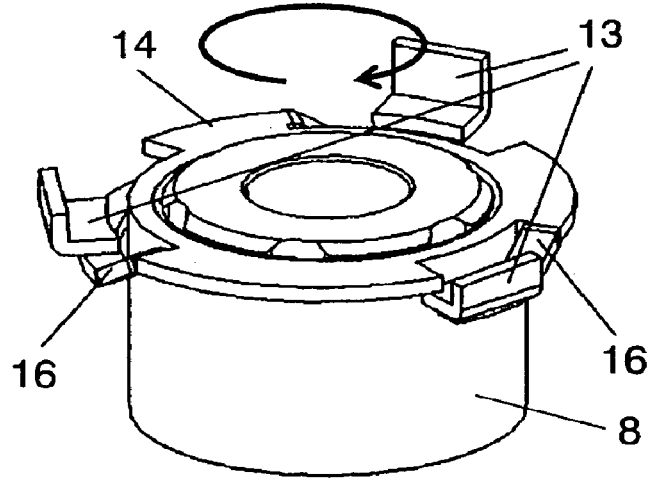
FIG. 3B is a perspective view illustrating the state at the moment when the engaging member is engaged with the engaged member.
Figure 3C:
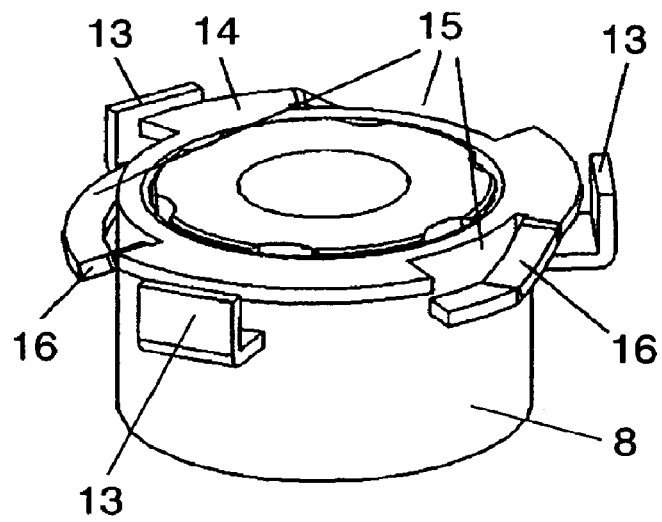
FIG. 3C is a perspective view illustrating the state after the completion of the engagement.
Figure 4A:
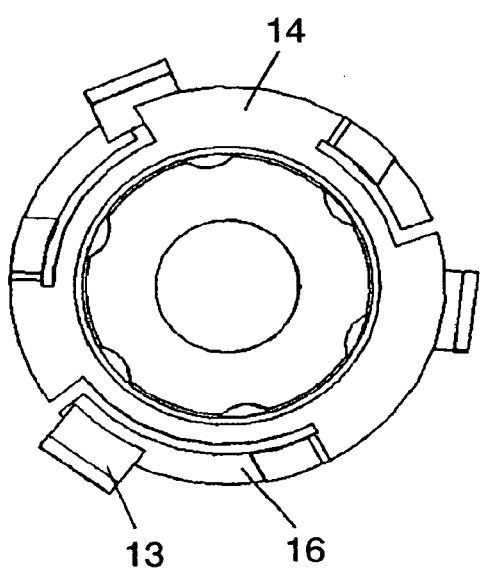
FIGS. 4A and 4B are top views illustrating the process in which the engaging member of the turntable disengages from the engaged member of the bearing housing.
Figure 4B:
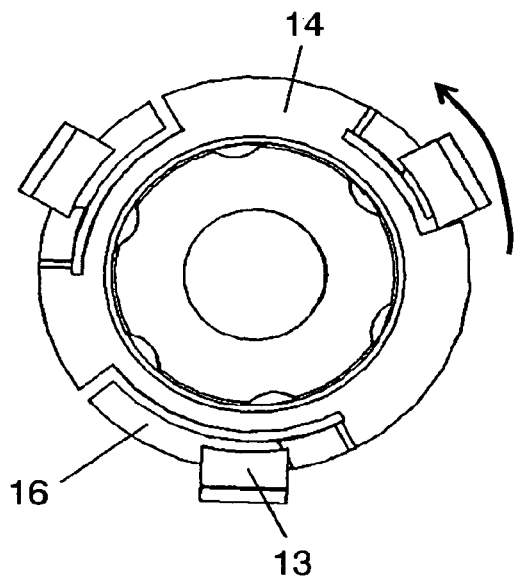

FIG. 1 is a section view illustrating the structure of a disc-rotating motor of a disc-driving unit in accordance with a first exemplary embodiment of the present invention. FIG. 2 is a perspective view of a stator of the motor shown in FIG. 1. FIG. 3A is a perspective view illustrating the state before an engaging member of a turntable is engaged with an engaged member of a bearing housing in the motor shown in FIG. 1. FIG. 3B is a perspective view illustrating the state at the moment when the engaging member is engaged with the engaged member. FIG. 3C is a perspective view illustrating the state after the completion of the engagement. FIGS. 4A and 4B are top views illustrating the process in which the engaging member of the turntable disengages from the engaged member of the bearing housing.

Here will be described the structure of a disc-driving unit of the first exemplary embodiment. In FIG. 1 through FIG. 4B, disc-driving unit 65 of the first exemplary embodiment has rotor 6, stator 12, which are shown in FIG. 1, and drop-guard mechanism 70 of FIG. 3A for preventing the rotor from coming out of the stator.

Rotor 6 contains, as shown in FIG. 1, turntable 1 on which a disc (not shown) is mounted, rotor frame 2, and shaft 5 fixed to rotor frame 2.

Stator 12 contains bearing 7 for supporting shaft 5 of rotor 6, bearing housing 8 for holding bearing 7, and stator core 10 with a winding thereon, and bracket 11 for holding bearing housing 8.

Drop-guard mechanism 70 has a following structure. A plurality of engaging members 13 are integrally formed on turntable 1 of rotor 6. On the side of stator 12, engaged member 14 is integrally formed on bearing housing 8. Engaged member 14 is formed of i) a plurality of recesses 15 each of which has an opening wide enough for passing through each of engaging members 13, and ii) a plurality of guides 16 for helically guiding engaging members 13 into recesses 15. The helical engagement of engaging members 13 with engaged member 14 forms Drop-guard mechanism 70.

Now will be described more in-detail explanation on the structure of disc-driving unit 65 of the first exemplary embodiment with reference to FIG. 1.

Disc-driving unit 65 shown in FIG. 1 rotates a disc (not shown) by disc-rotating motor 60 (hereinafter, motor 60). Motor 60 has rotor 6 and stator 12.

Rotor 6 contains turntable 1 for mounting a disc thereon, rotor frame 2, disc core-alignment member 3 holds a disc together with turntable 1, rotor magnet 4 attached to rotor frame 2, and shaft 5 disposed at the center of rotor frame 2.

Stator 12 contains bearing 7 for supporting shaft 5 of rotor 6, bearing housing 8 for holding bearing 7, stator core 10 with winding 9 that faces rotor magnet 4 via air-gap, and bracket 11 for holding bearing housing 8.

Now will be given an in-detail explanation on drop-guard mechanism 70 in disc-driving unit 65 of the first exemplary embodiment.

On turntable 1, a plurality of L-shaped engaging members 13 are integrally formed by press working. Engaging members 13 play an important role in preventing coming-out of the rotor.

On bearing housing 8, as shown in FIG. 2 and FIG. 3A, engaged member 14 is integrally formed so as to have an engagement with engaging members 13 of turntable 1 in an axial direction (where, the axial direction is the direction in which shaft 5 extends). Engaged member 14 has a helical structure formed of a plurality of recesses 15 and a plurality of guides 16.

FIG. 3A through FIG. 3C illustrate the engaging process between engaging members 13 and engaged member 14, whereas FIG. 4A and FIG. 4B illustrate the disengaging process between them.

Rotor 6 is fixed to stator 12 as follows: first, as shown in FIG. 3A, position engaging members 13 of turntable 1 of rotor 6 to recesses 15 formed on engaged member 14 of bearing housing 8 of stator 12. Next, place engaging members 13 along the upper surface of guides 16 and circumferentially insert engaging members 13—from a first side toward a second side in a direction indicated by the arrow in FIG. 3B—into recesses 15 to have a clockwise helical engagement. Under the engagement, engaging members 13 settle under engaged member 14, as shown in FIG. 3C. Rotor 6 is thus fitted with stator 12.

Rotor 6 undergoes a downward magnetic thrust force generated by an axial magnetic suction force, and therefore, engaging members 13 of rotor 6 are positioned lower than guides 16. The positional relationship protects rotor 6 from coming-out if rotor 6 rotates counterclockwise.

On bearing housing 8, as described above, engaged member 14 is integrally formed. Engaged member 14 contains a plurality of recesses 15 each of which has an opening wide enough for passing through each of engaging members 13, and a plurality of guides 16 for helically guiding engaging members 13 into recesses 15 in a circumferential direction from a first side toward a second side, as indicated by the arrow in FIG. 3B. The helical engagement of engaging members 13 with engaged member 14 forms drop-guard mechanism 70.

Under the engagement, even if an upward force in an axial direction that is generated by some reasons is applied to rotor 6, engaging members 13 are blocked by the lower surface of engaged member 14 having guides 16. Rotor 6 is thus protected from coming out of the stator.

Besides, the disc-rotating motor usually rotates clockwise only. As shown in FIG. 3A through FIG. 3C, each slope of guides 16 is downwardly inclined toward clockwise. Therefore, even if an axially upward force is applied to rotor 6 in rotation, rotor 6 is protected from coming out.

The structure above protects rotor 6 from coming out, even if disturbance including a shake or a shock occurs. In case of necessity, however, the structure allows rotor 6 to be easily removed from the stator as follows: pull rotor 6 upward in an axial direction and then rotate engaging members 13 counterclockwise along the upper side of guides 16.

As shown in FIG. 1, engaged member 14 of bearing housing 8 and engaging members 13 of turntable 1 can be integrally formed by press working. In the simple structure with the use of relatively low-cost materials, a parts count also can be reduced, and accordingly, assembling efficiency is enhanced.

Engaging members 13 and engaged member 14, as shown in FIGS. 1 and 2, contribute to a space-saving design; i) axially, they fit in a space having the thickness of bearing housing 8 plus guides 16 that guides to a helical engagement with engaging members 13, ii) circumferentially, they fit in a space between the outer diameter of bearing housing 8 and the inner diameter of stator core 10 with winding 9 thereon. This allows the motor to have smaller and thinner structure.

As another advantage, engaging members 13 and engaged member 14 are disposed outside bearing 7. Therefore, bearing 7 can keep its necessary length. Not only reduction in size and thickness, the structural advantage also enhances reliability in long life of a product.

Furthermore, by virtue of a helical engagement, members 13 and 14 don't have to be elastically changing (in shape) members. Employing such members with high rigidity gives the disc-driving unit greater durability in exchanging discs over tens of thousands of times, allowing the unit to have high reliability.

Second Embodiment

Figure 5:
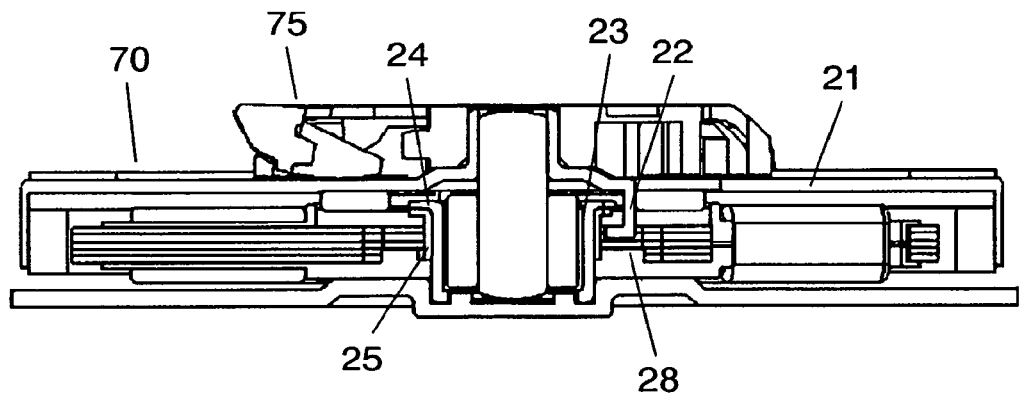
FIG. 5 is a section view illustrating the structure of a disc-rotating motor of a disc-driving unit in accordance with a second exemplary embodiment of the present invention.

FIG. 5 is a section view illustrating a disc-rotating motor of a disc-driving unit in accordance with a second exemplary embodiment.

According to motor 70 of disc-driving unit 75 of the second embodiment, the structure differs from that described in the first embodiment in that the engaged member has a two-layer structure formed of i) engaged member 24 that is formed on bearing housing 23 as a first member, and ii) movable shielding ring 25 that is made of a different material as a second member. The two-layer structure, where the first and the second members make a close fit with each other, axially engages with engaging members 22 of turntable 21. Each of the first member (i.e., engaged member 24) and the second member (i.e., shielding ring 25) has a plurality of notches.

Figure 6A:
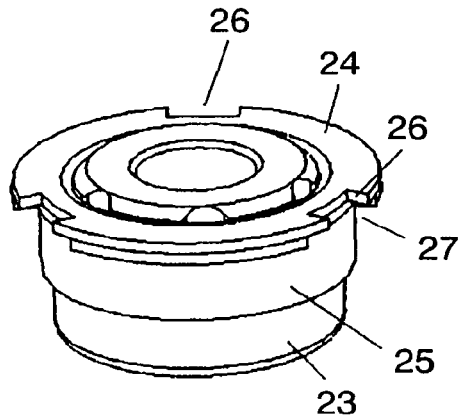
FIG. 6A is a perspective view illustrating the engaged member of the bearing housing and a shielding ring in the motor shown in FIG. 5.
Figure 6B:
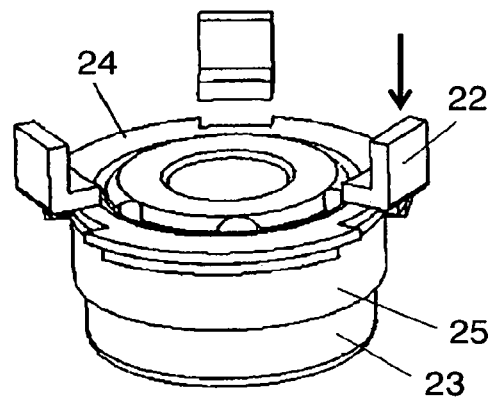
FIG. 6B is a perspective view illustrating the state before the engaging member of the turntable is engaged with the engaged member of the bearing housing in the motor shown in FIG. 5.
Figure 6C:
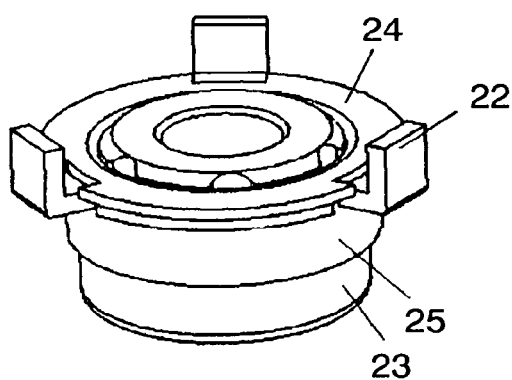
FIG. 6C is a perspective view illustrating the state at the moment when the engaging member is engaged with the engaged member.
Figure 6D:
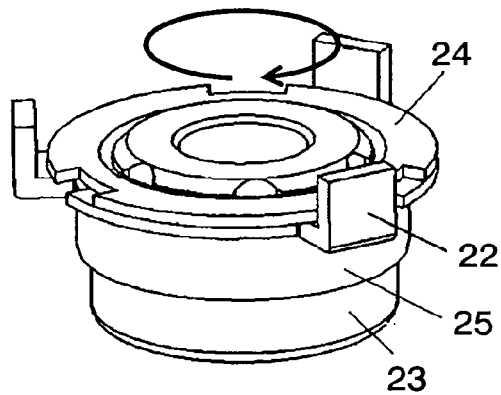
FIG. 6D is a perspective view illustrating the state in which the engaging member of the turntable rotates the shielding ring.
Figure 6E:
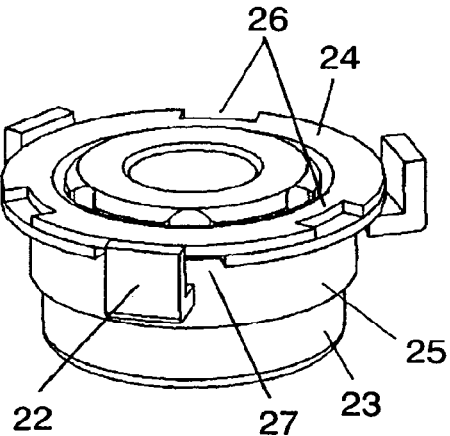
FIG. 6E is a perspective view illustrating the state after the completion of the engagement.

FIGS. 6A through 6E are perspective views illustrating an engaging process between engaging members 22 and engaged member 24 of motor 70 shown in FIG. 5. Specifically, FIG. 6A shows engaged member 24 of bearing housing 23 and shielding ring 25. FIG. 6B shows the state before engaging members 22 of turntable 21 are engaged with engaged member 24 of bearing housing 23. FIG. 6C shows the state at the moment when engaging members 22 are engaged with engaged member 24. FIG. 6D shows the state in which engaging members 22 of turntable 21 rotates shielding ring 25. FIG. 6E shows the state after the completion of the engagement.

Hereinafter, more detailed explanation on how to fix the rotor to the stator of motor 70 is given with reference to the drawings above.

First, set engaged member 24 of bearing housing 23 and shielding ring 25 in a circumferential proper position so that notches 26 of engaged member 24 meet with notches 27 of shielding ring 25 (FIG. 6A); then position engaging members 22 of turntable 21 to notches 26 and 27 (FIG. 6B); pass engaging members 22 through notches 26 to place them under engaged member 24 (FIG. 6C) and rotate shielding ring 25, which is formed so as to be circumferentially rotatable, in a clockwise direction (FIG. 6D) until each of notches 27 of shielding ring 25 positions between notches 26 of engaged member 24 of bearing housing 23 (FIG. 6E).

Through the process above, notches 26 of engaged member 24 are closed by shielding ring 25, whereby an axially movement of the rotor is intercepted.

Although shielding ring 25 is circumferentially rotatable, it is fixed so as to be insusceptible to a shake or a shock unless the force is intentionally applied to the ring.

Figure 7:
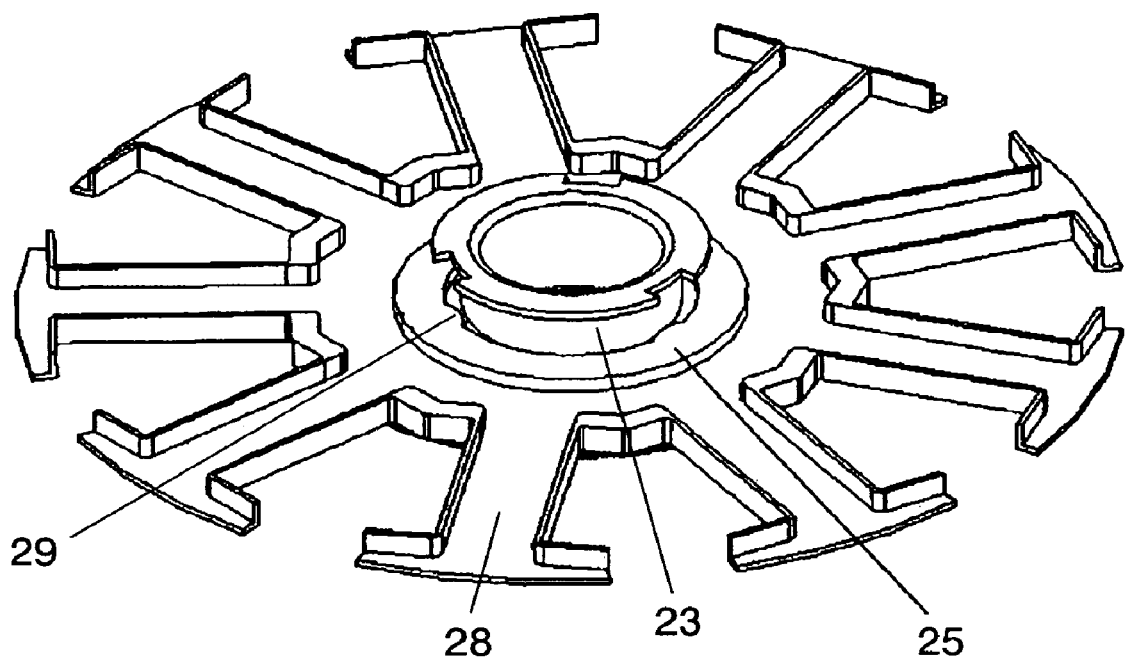
FIG. 7 is a perspective view illustrating the state of engagement of an insulator of a stator core and the shielding ring.

To be more specific, shielding ring 25 is fitted in the inner diameter of insulator 28 disposed on the stator core, as shown in FIG. 7. Ribs 29 are formed at predetermined positions on the inner diameter of shielding ring 25. Forming ribs 29 not only allows shielding ring 25 to have circumferential rotation when a load beyond a certain amount is applied, but also allows ring 25 to make a sufficiently tight fit with the outer wall of bearing housing 23.

Shielding ring 25 therefore has no circumferential rotation by a shake or a shock. That is, notches 26 of engaged member 24 are kept in a closed position, whereby it is ensured that the movement in a direction in which the rotor comes out is intercepted.

In recent years, reducing vibrations and noise is an important technical challenge in disc-driving units. According to the disc-driving unit of the second embodiment, it is unlikely that shielding ring 25 serves as a vibration generator to increase vibrations and noise in the unit.

Figure 8A:
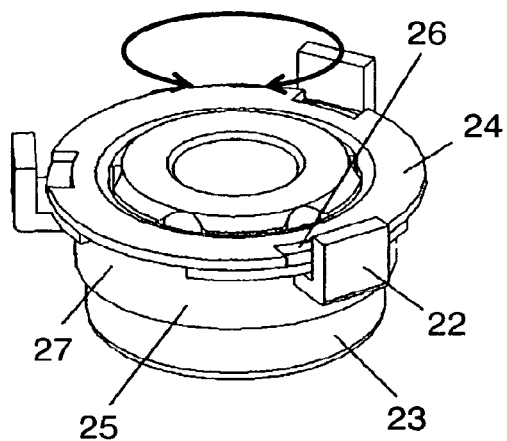
FIGS. 8A, 8B, and 8C are perspective views illustrating the state in which the engaging member of the turntable disengages from the engaged member of the bearing housing.
Figure 8B:
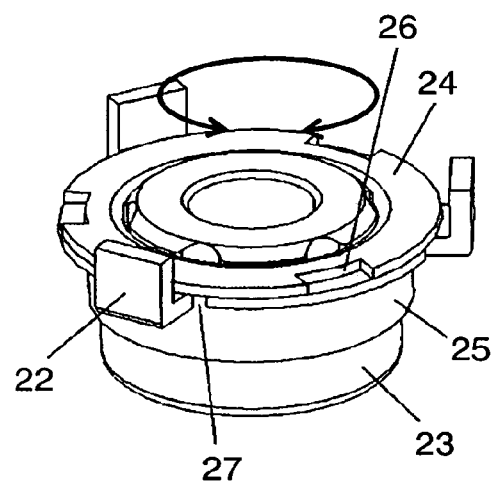
Figure 8C:
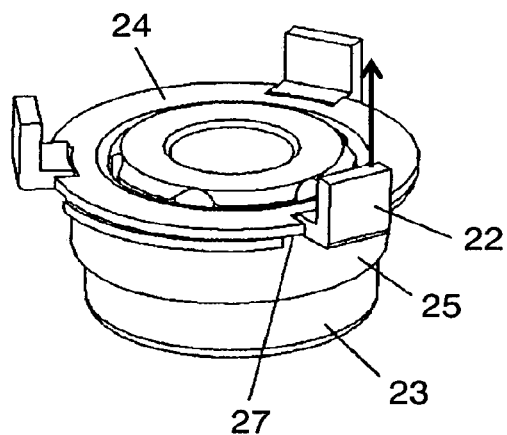

Here will be described the process in which the rotor is intentionally removed from the stator by necessity with reference to FIGS. 8A, 8B, and 8C. FIGS. 8A through 8C are perspective views illustrating the state in which engaging members 22 of the turntable is disengaged from engaged member 24 of bearing housing 23. The rotor can be removed from the stator as the following process. First, move the rotor axially upward and, with a slight load applied to engaging member 22 to keep contact with shielding ring 25, rotate the rotor clockwise or counterclockwise (FIG. 8A) until engaging members 22 meet with notches 27 of shielding ring 25 (FIG. 8B). Since the rotor is mounted on the stator, visual check cannot tell the exact moment at which the engaging members meet with the notches; however, when they have a right position, the axial position of the rotor is raised by the thickness of shielding ring 25. This will be helpful to know the right positioning.

Next, rotate the rotor clockwise or counterclockwise, with engaging members 22 lifted up by a slight load, until engaging members 22 meet with notches 26 of engaged member 24 (FIG. 8C). Through the process above, engaging members 22 can pass through notches 26. The rotor is thus removed from the stator.

Such structured disc-driving unit of the embodiment can offer the effect similar to that obtained by the structure of the first embodiment.

Third Embodiment

Figure 9:
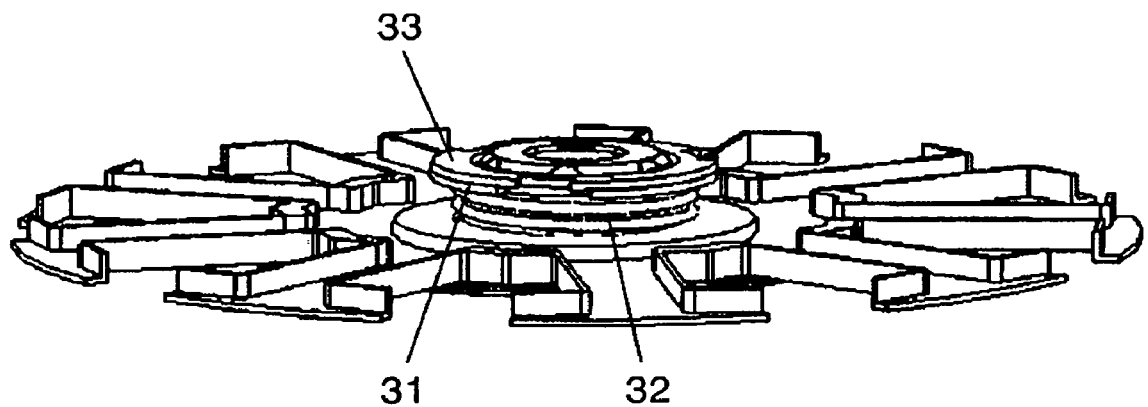
FIG. 9 is a perspective view illustrating the state in which the insulator of the stator core engages with the shielding ring in a disc-rotating motor of a disc-driving unit in accordance with a third exemplary embodiment of the present invention.

FIG. 9 is a perspective view illustrating the state in which the insulator of the stator core engages with the shielding ring in a disc-rotating motor of a disc-driving unit in accordance with a third exemplary embodiment of the present invention. The drawing shows only the essential part of engaged member 33.

The structure of the third embodiment differs from that of the second embodiment in that coil spring 32 presses shielding ring 31 against the lower surface of engaged member 33 of the bearing housing. Such structured disc-driving unit of the embodiment can offer the effect similar to that obtained by the structure of the second embodiment.

Fourth Embodiment

Figure 10:
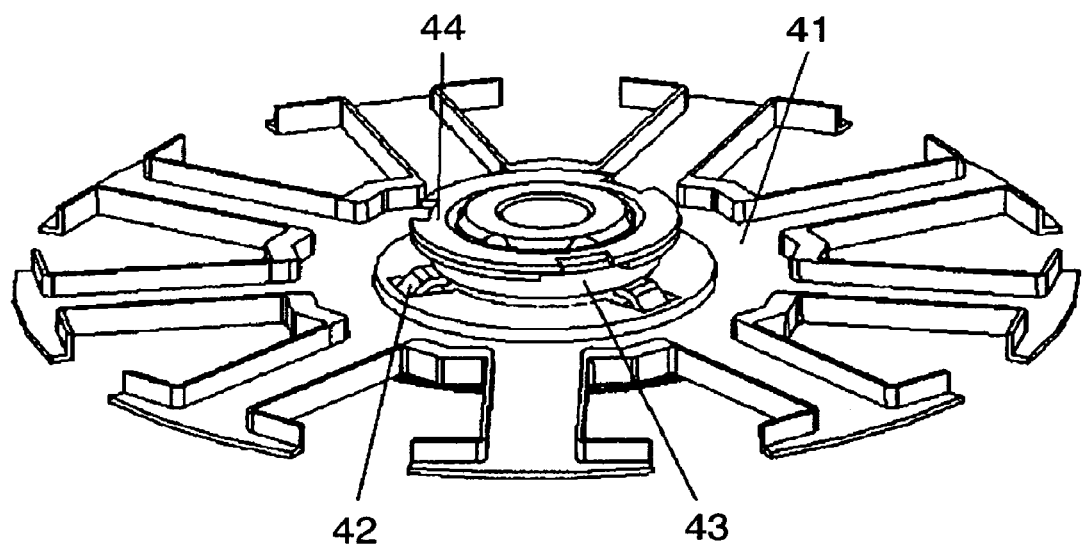
FIG. 10 is a perspective view illustrating the state in which the insulator of the stator core engages with the shielding ring in a disc-rotating motor of a disc-driving unit in accordance with a fourth exemplary embodiment of the present invention.

FIG. 10 is a perspective view illustrating the state in which the insulator of the stator core engages with the shielding ring in a disc-rotating motor of a disc-driving unit in accordance with a fourth exemplary embodiment of the present invention. The drawing shows only the essential part of engaged member 44.

The structure of the fourth embodiment differs from that of the second embodiment in that spring section 42 is integrally formed on insulator 41 so as to urge the shielding ring in an axial direction. Spring section 42 presses shielding ring 43 against the lower surface of engaged member 44 of the bearing housing, whereby shielding ring 43 is properly positioned. Such structured disc-driving unit of the embodiment can offer the effect similar to that obtained by the structure of the second embodiment.

Fifth Embodiment

Figure 11A:
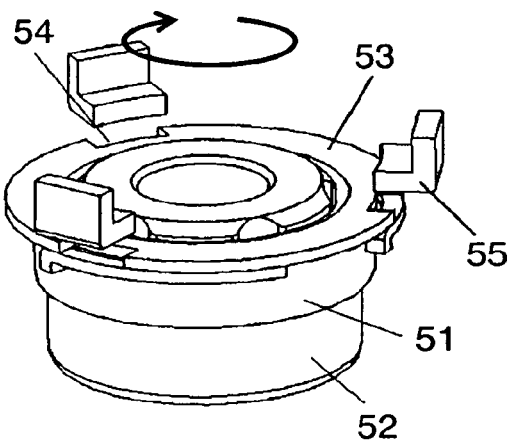
FIG. 11A is a perspective view illustrating the state before the engaging member of the turntable is engaged with the engaged member of the bearing housing in a disc-rotating motor of a disc-driving unit in accordance with a fifth exemplary embodiment of the present invention.
Figure 11B:
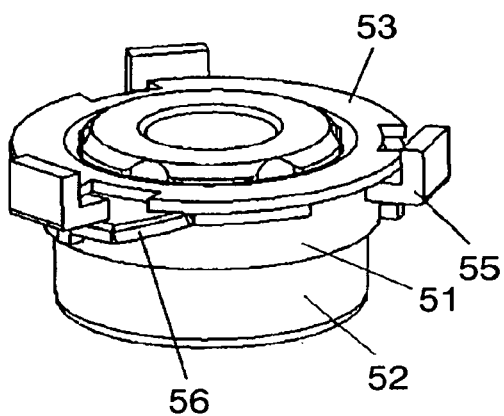
FIG. 11B is a perspective view illustrating the state at the moment when the engaging member is engaged with the engaged member.
Figure 11C:
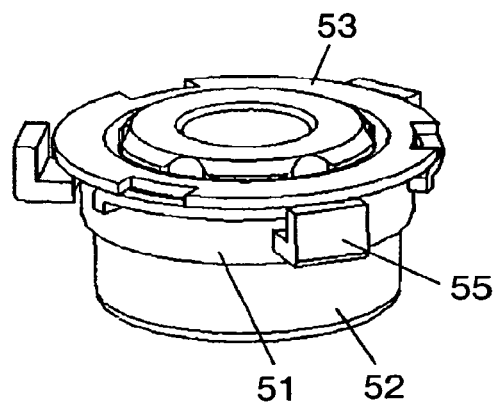
FIG. 11C is a perspective view illustrating the state after the completion of the engagement.

FIG. 11A is a perspective view illustrating the state before the engaging member of the turntable is engaged with the engaged member of the bearing housing in a disc-rotating motor of a disc-driving unit in accordance with a fifth exemplary embodiment of the present invention. FIG. 11B is a perspective view illustrating the state at the moment when the engaging member is engaged with the engaged member. FIG. 11C is a perspective view illustrating the state after the completion of the engagement.

The disc-driving unit of the fifth embodiment differs from those described in the second through fourth embodiments in that shielding ring 51 is made of a material that elastically changes its shape, such as resin, and metal having elasticity.

By virtue of the elasticity of shielding ring 51, assembling efficiency is improved. That is, the elasticity not only allows the rotor to be easily fitted with the stator, but also covers, with reliability, notches 54 of engaged member 53 of bearing housing 52.

The rotor is attached to the stator as follows: first, position engaging members 55 of the turntable to notches 54 of engaged member 53 of bearing housing 52 (FIG. 11A); press engaging members 55 in notches 54 so that spring section 56 has an elastic change (FIG. 11B); then rotate the rotor clockwise (FIG. 11C) until engaging members 55 settle under engaged member 53. The engagement of engaging members 55, engaged member 53, and shielding ring 51 protects the rotor from coming out of the stator in an axial direction.

Figure 12A:
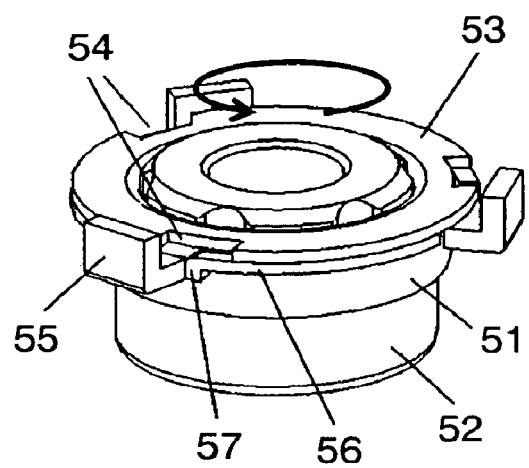
FIGS. 12A and 12B are perspective views illustrating the process in which the engaging member of the turntable disengages from the engaged member of the bearing housing.
Figure 12B:
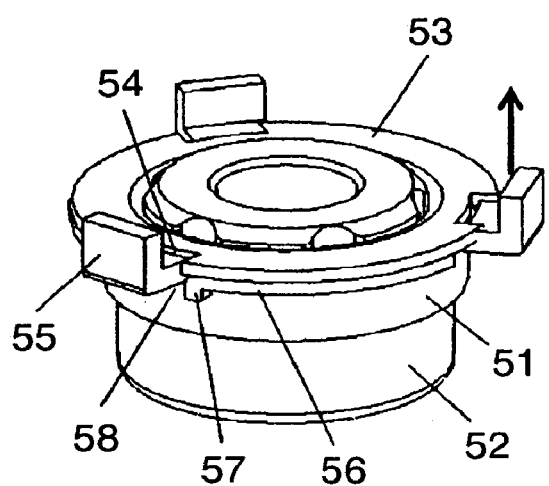

Like in the second embodiment, the rotor can be removed from the stator as the need arises. The removing process is as follows: applying a load to tip 57 of spring section 56 formed on shielding ring 51 in a counterclockwise direction to rotate shielding ring 51 counterclockwise (FIG. 12A) until notches 58 of shielding ring 51 meet with notches 54 of bearing housing 52 (FIG. 12B). After that, passing engaging members 55 through notches 54 allows the rotor to be come out of the stator.

In the structure above, shielding ring 51 can be held by any one of the methods employed in the second through the fourth embodiments.

The structure of the fifth embodiment not only enhances the assembling efficiency of the motor, but also offers more positive shielding against notches 54 of engaged member 53, thereby improving safety and reliability of the unit.

The disc-driving unit of the present invention is particularly useful for a brushless motor used for mobile equipment, such as a spindle motor for an optical disc, where reduction in size and thickness, reliability, and environment friendliness is highly expected.

Sixth Embodiment

Figure 13:
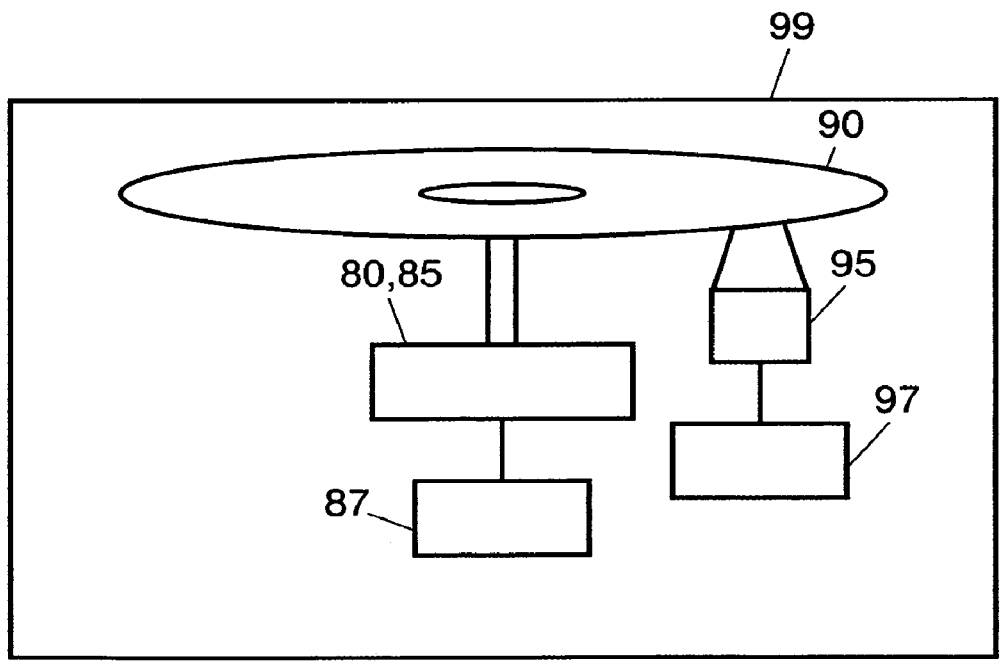
FIG. 13 schematically shows the structure of disc equipment in accordance with a sixth exemplary embodiment of the present invention.
Figure 14:
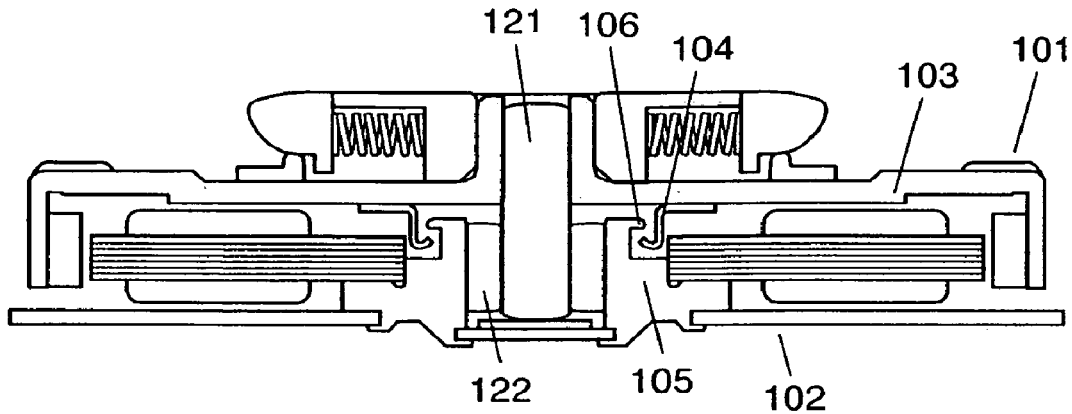
FIG. 14 is a section view illustrating the structure of a conventional disc-rotating motor.
Figure 15:
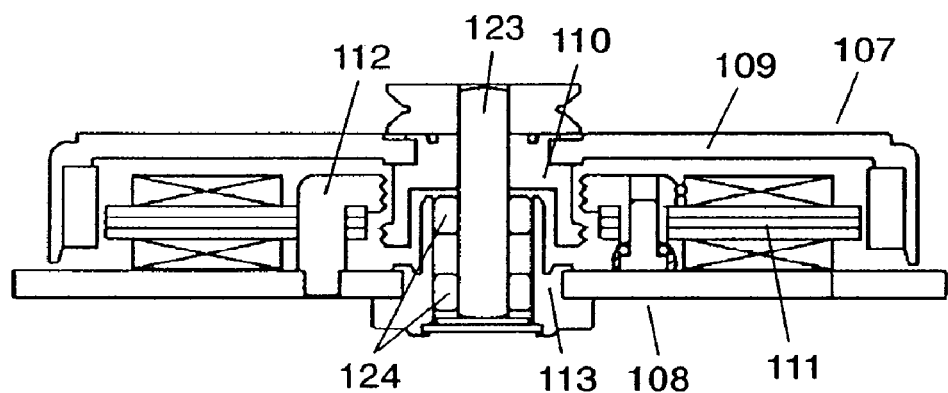
FIG. 15 is a section view illustrating the structure of another conventional disc-rotating motor.
Figure 16:
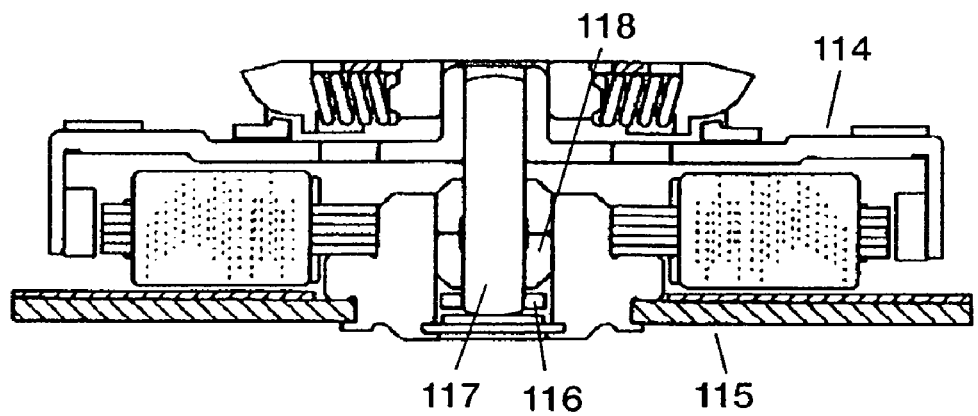
FIG. 16 is a section view illustrating the structure of still another conventional disc-rotating motor.

FIG. 13 schematically shows the structure of disc equipment in accordance with a sixth embodiment.

Disc equipment 99 of the embodiment of FIG. 13 may be a disc player or a disc recorder. Disc equipment 99 has motor 80 of disc-driving unit 85 for rotating disc 90. Motor 80 driven by motor-driving circuit 87 rotates disc 90. Pickup 95 driven by pickup-driving circuit 97 exchanges data with disc 90.

A disc-driving unit described in the first through the fifth embodiments can be employed for disc equipment 99. Disc equipment 99 of the sixth embodiment thus offers the same effect as those obtained in the first through the fifth embodiments.

What is claimed is:

1. A disc-driving unit comprising:
   i) a rotor further including:
      a turntable for mounting a disc thereon;
      a rotor frame; and
      a shaft disposed on the rotor frame;
   ii) a stator further including:
      a bearing for supporting the shaft;
      a bearing housing for holding the bearing;
      a stator core with a winding thereon; and
      a bracket for holding the bearing housing; and
   iii) a drop-guard mechanism for protecting the rotor from coming out of the stator,
   wherein, a plurality of engaging sections are integrally formed on the turntable,
   the bearing housing contains an integrally formed first engaged section and a rotatably held second engaged section,
   each of the engaging sections and the engaged sections have a plurality of notches, and
   an engagement of the engaging sections, the first engaged section, and the second engaged section forms the drop-guard mechanism.

2. The disc-driving unit as claimed in claim 1, wherin the second engaged section contains a plurality of elastic spring sections.

3. Disc equipment having the disc-driving unit as claimed in claim 1.

4. Disc equipment having the disc-driving unit as claimed in claim 2.

\* \* \* \* \*